United States Patent
Ghasripoor et al.

(10) Patent No.: US 12,296,421 B2
(45) Date of Patent: May 13, 2025

(54) SYSTEMS AND METHODS FOR REPAIRING FLUID HANDLING EQUIPMENT

(71) Applicant: Energy Recovery, Inc., San Leandro, CA (US)

(72) Inventors: Farshad Ghasripoor, Berkeley, CA (US); Jeremy Grant Martin, Oakland, CA (US)

(73) Assignee: Energy Recovery, Inc., San Leandro, CA (US)

( * ) Notice: Subject to any disclaimer, the term of this patent is extended or adjusted under 35 U.S.C. 154(b) by 122 days.

(21) Appl. No.: 17/329,733

(22) Filed: May 25, 2021

(65) Prior Publication Data

US 2021/0277917 A1    Sep. 9, 2021

Related U.S. Application Data

(62) Division of application No. 14/818,219, filed on Aug. 4, 2015, now Pat. No. 11,047,398.

(60) Provisional application No. 62/033,525, filed on Aug. 5, 2014.

(51) Int. Cl.
| | |
|---|---|
| *B23P 6/00* | (2006.01) |
| *E21B 43/26* | (2006.01) |
| *E21B 43/267* | (2006.01) |
| *F04F 13/00* | (2009.01) |

(52) U.S. Cl.
CPC ............ *B23P 6/00* (2013.01); *E21B 43/2607* (2020.05); *E21B 43/267* (2013.01); *F04F 13/00* (2013.01)

(58) Field of Classification Search
CPC .................................. B23P 6/00; B23P 6/005
See application file for complete search history.

(56) References Cited

U.S. PATENT DOCUMENTS

| | | |
|---|---|---|
| 2,491,678 A | 12/1949 | Mcculloch |
| 2,621,946 A | 12/1952 | Jendrassik |
| 2,675,173 A | 4/1954 | Jendrasski |
| 2,766,928 A | 10/1956 | Boszormenyi |
| 2,836,346 A | 5/1958 | Andre |
| 2,873,718 A | 2/1959 | Brautigam |
| 2,946,184 A | 7/1960 | Boszormenyi |
| 2,968,435 A | 1/1961 | Boszormenyi |
| 3,074,622 A | 1/1963 | Berchtold |
| 3,109,580 A | 11/1963 | Kentfield |
| 3,120,919 A | 2/1964 | Gardiner |

(Continued)

FOREIGN PATENT DOCUMENTS

| | | |
|---|---|---|
| CH | 269277 A | 6/1950 |
| CH | 270114 A | 8/1950 |

(Continued)

OTHER PUBLICATIONS

PCT International Search Report and Written Opinion; Application No. PCT/US2015/043838; Dated Nov. 19, 2015; 12 pages.

(Continued)

*Primary Examiner* — Christopher J. Besler
(74) *Attorney, Agent, or Firm* — Lowenstein Sandler LLP (57) ABSTRACT

A method includes removing a worn portion from a component of a rotary isobaric pressure exchanger (IPX). The rotary IPX is configured to exchange pressures between a first fluid and a second fluid. The method further includes repairing the component after the worn portion is removed from the component.

17 Claims, 8 Drawing Sheets

(56) References Cited

U.S. PATENT DOCUMENTS

| | | | |
|---|---|---|---|
| 3,145,909 A | 8/1964 | Gardiner | |
| 3,164,318 A | 1/1965 | Barnes | |
| 3,209,986 A | 10/1965 | Kentfield | |
| 3,218,807 A | 11/1965 | Berchtold | |
| 3,234,736 A | 2/1966 | Spalding | |
| 3,291,379 A | 12/1966 | Herger | |
| 3,362,619 A | 1/1968 | Brown | |
| 3,431,747 A | 3/1969 | Hashemi | |
| 3,582,090 A | 6/1971 | Lott | |
| 3,591,313 A | 7/1971 | Wunsch | |
| 3,708,069 A | 1/1973 | Clark | |
| 3,910,587 A | 10/1975 | Loeffler | |
| 4,083,650 A | 4/1978 | Zboril | |
| 4,126,922 A | 11/1978 | Eagens | |
| 4,198,195 A | 4/1980 | Sakamaki et al. | |
| 4,274,811 A | 6/1981 | Rao | |
| 4,839,214 A | 6/1989 | Oda | |
| 4,883,216 A | 11/1989 | Patsfall | |
| 4,887,942 A | 12/1989 | Hauge | |
| 5,069,600 A | 12/1991 | Althaus et al. | |
| 5,267,432 A | 12/1993 | Paxson | |
| 5,338,158 A | 8/1994 | Hauge | |
| 5,634,767 A | 6/1997 | Dawson | |
| 5,822,852 A | 10/1998 | Bewlay | |
| 5,913,555 A | 6/1999 | Richter | |
| 5,988,993 A | 11/1999 | Hauge | |
| 6,138,456 A | 10/2000 | Garris | |
| 6,238,187 B1 | 5/2001 | Dulaney | |
| 6,254,729 B1 | 7/2001 | Doelle | |
| 6,438,838 B1 | 8/2002 | Meier | |
| 6,449,939 B1 | 9/2002 | Snyder | |
| 6,540,487 B2 * | 4/2003 | Polizos | F04B 1/2042 417/103 |
| 6,623,572 B2 | 9/2003 | Doelle | |
| 7,207,781 B2 | 4/2007 | Shumway | |
| 7,214,315 B2 | 5/2007 | Shumway | |
| 7,799,221 B1 | 9/2010 | MacHarg | |
| 7,896,617 B1 | 3/2011 | Morando | |
| 8,087,914 B1 | 1/2012 | Soderstrom | |
| 8,092,168 B2 | 1/2012 | Vedhagiri | |
| 8,529,222 B2 | 9/2013 | Burns | |
| 9,017,052 B1 | 4/2015 | Soderstrom | |
| 9,328,743 B2 | 5/2016 | Hirosawa | |
| 9,377,021 B1 | 6/2016 | Soderstrom | |
| 9,764,517 B2 * | 9/2017 | Potter | B22F 10/25 |
| 2002/0025264 A1 | 2/2002 | Polizos et al. | |
| 2002/0146325 A1 | 10/2002 | Shumway | |
| 2002/0148115 A1 | 10/2002 | Burke | |
| 2003/0082053 A1 | 5/2003 | Jackson | |
| 2003/0221549 A1 | 12/2003 | Hansen et al. | |
| 2004/0052639 A1 | 3/2004 | Al Hawaj | |
| 2004/0096322 A1 | 5/2004 | Caddell | |
| 2004/0202562 A1 | 10/2004 | Grassbaugh et al. | |
| 2005/0091848 A1 * | 5/2005 | Nenov | F01D 5/005 416/223 R |
| 2005/0102835 A1 | 5/2005 | Trewiler | |
| 2005/0106998 A1 | 5/2005 | Lin | |
| 2005/0181231 A1 | 8/2005 | Gupta | |
| 2005/0249619 A1 | 11/2005 | El-Sayed | |
| 2006/0032808 A1 | 2/2006 | Hauge | |
| 2006/0054223 A1 | 3/2006 | Baumgarten | |
| 2006/0060245 A1 | 3/2006 | Baumgarten | |
| 2006/0134454 A1 | 6/2006 | Sathian | |
| 2006/0245909 A1 | 11/2006 | Stover | |
| 2007/0084047 A1 | 4/2007 | Lange | |
| 2007/0104588 A1 | 5/2007 | Bross | |
| 2007/0137170 A1 | 6/2007 | Bross | |
| 2007/0212231 A1 | 9/2007 | Bross | |
| 2008/0053106 A1 | 3/2008 | Vontell | |
| 2008/0107227 A1 | 5/2008 | Koepke | |
| 2008/0223207 A1 | 9/2008 | Olsen | |
| 2009/0064500 A1 | 3/2009 | Reynolds | |
| 2009/0104046 A1 | 4/2009 | Martin et al. | |
| 2009/0144980 A1 | 6/2009 | Rangarajan | |
| 2009/0180903 A1 * | 7/2009 | Martin | B01D 61/06 417/405 |
| 2009/0185917 A1 | 7/2009 | Andrews | |
| 2009/0271984 A1 | 11/2009 | Hasselberg | |
| 2010/0011774 A1 | 1/2010 | Johnson | |
| 2010/0074755 A1 | 3/2010 | Richter | |
| 2010/0189555 A1 | 7/2010 | Quinn | |
| 2010/0196152 A1 | 8/2010 | Pique | |
| 2010/0293946 A1 | 11/2010 | Vick | |
| 2010/0325887 A1 | 12/2010 | Perret | |
| 2011/0008182 A1 | 1/2011 | Krogsgard et al. | |
| 2011/0099809 A1 | 5/2011 | Hovel | |
| 2011/0099810 A1 | 5/2011 | Stankowski | |
| 2011/0162751 A1 | 7/2011 | Fitzgerald et al. | |
| 2011/0176936 A1 | 7/2011 | Andrews | |
| 2011/0203987 A1 | 8/2011 | Friedrichsen et al. | |
| 2011/0264413 A1 | 10/2011 | Stankowski | |
| 2012/0047734 A1 | 3/2012 | Miller | |
| 2012/0063894 A1 | 3/2012 | Chen | |
| 2012/0067825 A1 | 3/2012 | Pique et al. | |
| 2012/0099993 A1 | 4/2012 | Guerenbourg | |
| 2012/0125979 A1 | 5/2012 | Daniels | |
| 2012/0144641 A1 | 6/2012 | Minato | |
| 2012/0222306 A1 * | 9/2012 | Mittendorf | B33Y 30/00 29/889.1 |
| 2012/0257991 A1 | 10/2012 | Woodthorpe | |
| 2013/0019473 A1 | 1/2013 | DeMichael | |
| 2013/0037464 A1 | 2/2013 | Friedrichsen | |
| 2013/0121850 A1 | 5/2013 | Pinto | |
| 2013/0161094 A1 | 6/2013 | Broughton | |
| 2013/0209295 A1 | 8/2013 | Ramos | |
| 2013/0280038 A1 | 10/2013 | Martin | |
| 2013/0294944 A1 | 11/2013 | Hirosawa | |
| 2013/0326876 A1 | 12/2013 | Weiss | |
| 2013/0334223 A1 | 12/2013 | Hauge | |
| 2014/0003926 A1 | 1/2014 | Steffen | |
| 2014/0003948 A1 | 1/2014 | Dubs | |
| 2014/0030464 A1 | 1/2014 | Das | |
| 2014/0044536 A1 | 2/2014 | Sassatelli | |
| 2014/0048143 A1 | 2/2014 | Lehner | |
| 2014/0086769 A1 | 3/2014 | Barnett, Jr. | |
| 2014/0109406 A1 | 4/2014 | Golden | |
| 2014/0128655 A1 | 5/2014 | Arluck | |
| 2014/0128656 A1 | 5/2014 | Arluck | |
| 2014/0154082 A1 | 6/2014 | Shinn | |
| 2014/0178206 A1 | 6/2014 | Gohler | |
| 2014/0184502 A1 | 7/2014 | Liu | |
| 2014/0259665 A1 * | 9/2014 | Bruck | F01D 5/005 416/223 R |
| 2014/0331856 A1 | 11/2014 | Ramos | |
| 2015/0050163 A1 | 2/2015 | Sigurdsson | |
| 2015/0050164 A1 | 2/2015 | Sigurdsson | |
| 2015/0050167 A1 | 2/2015 | Hirosawa | |
| 2015/0158133 A1 | 6/2015 | Cheah | |
| 2015/0184492 A1 | 7/2015 | Ghasripoor | |
| 2015/0184502 A1 | 7/2015 | Krish et al. | |
| 2016/0084269 A1 | 3/2016 | Hauge | |

FOREIGN PATENT DOCUMENTS

| | | |
|---|---|---|
| CH | 342414 A | 11/1959 |
| CN | 1994905 | 7/2007 |
| CN | 200985289 | 12/2007 |
| CN | 101440828 A | 5/2009 |
| CN | 102865259 A | 1/2013 |
| CN | 102865260 A | 1/2013 |
| CN | 102553442 B | 11/2013 |
| DE | 1428210 | 7/1969 |
| DE | 19963714 | 7/2001 |
| DE | 102009041125 | 7/2011 |
| DK | 79142 | 4/1955 |
| EP | 0401187 | 12/1990 |
| EP | 1508361 A1 | 2/2005 |
| EP | 1563937 A2 | 8/2005 |
| EP | 1719920 | 11/2012 |
| EP | 2664801 A1 | 11/2013 |
| EP | 2762730 | 8/2014 |
| FR | 1300591 | 8/1962 |
| FR | 1310431 | 11/1962 |

(56) References Cited

FOREIGN PATENT DOCUMENTS

| FR | 1344244 | 11/1963 | |
|---|---|---|---|
| FR | 1374222 | 10/1964 | |
| GB | 644812 | 10/1950 | |
| GB | 722609 | 1/1955 | |
| GB | 744162 | 2/1956 | |
| GB | 765734 | 1/1957 | |
| GB | 775942 | 5/1957 | |
| GB | 820724 | 9/1959 | |
| GB | 862595 | 3/1961 | |
| GB | 867719 | 5/1961 | |
| GB | 915827 | 1/1963 | |
| GB | 917019 | 1/1963 | |
| GB | 919730 | 1/1963 | |
| GB | 920624 | 3/1963 | |
| GB | 927657 | 9/1963 | |
| GB | 1384959 | 2/1975 | |
| JP | 2000263247 | 9/2000 | |
| JP | 2010069568 | 4/2010 | |
| JP | 2011231634 | 11/2011 | |
| JP | 2012166184 | 9/2012 | |
| JP | 2013076379 | 4/2013 | |
| KR | 20140069693 | 6/2014 | |
| SU | 1756654 | 8/1992 | |
| WO | 9917028 | 4/1999 | |
| WO | 2005018782 | 3/2005 | |
| WO | 2006076884 | 7/2006 | |
| WO | 2009143819 | 12/2009 | |
| WO | 2013/017433 A1 | 2/2013 | |
| WO | 2013/019948 A1 | 2/2013 | |
| WO | 2013047487 | 4/2013 | |
| WO | 2014028905 | 2/2014 | |
| WO | WO-2014106753 A1 * | 7/2014 | ............ B22F 3/1055 |

OTHER PUBLICATIONS

Danfoss A/S; "User Manual; Installation, Operation and Maintenance Manual iSave40"; printed Dec. 2012; 76 pages.

Danfoss A/S; "Instruction; Disassembling and assembling iSave40"; Nov. 2012; 26 pages.

Danfoss A/S; "User Guide; Installation, Operation and Maintenance Maual iSave21"; Jun. 2012; 107 pages.

Danfoss A/S; "Parts list; iSave21" Mar. 2011; 9 pages.

Michas, Dimitrios; "Design of an Energy Recovery Concept for a Small-scale Renewable-driven Reverse Osmosis Desalination System"; Master of Science Thesis; Delft University of Technology; Oct. 2013; 139 pages.

Stover, Richard L., Ph.D .; "Energy Recovery Device Performance Analysis"; Water Middle East 2005; Energy Recovery, Inc.; Nov. 14, 2005; 3 pages.

Guirguis, Mageed Jean; "Energy Recovery Devices in Seawater Referse Osmosis Desalination Plants with Emphasis on Efficiency and Economical Analysis of Isobaric versus Centrifugal Devices"; Graduate Thesis and Dissertations; University of South Florida; Oct. 21, 2011; 123 pages.

Stover, Richard L. et al. "The Ghalilah SWRO plant: An overview of the solutions adopted to minimize energy consumption"; Desalination, Nov. 2005; pp. 217-221; vol. 184.

Abstract for Kim, Y. et al. "Reduction of energy consumption in seawater reverse osmosis desalination pilot plant by using energy recovery devices"; Desalination and Water Treatment; published online Jul. 6, 2012; vol. 51, 2013, Issue 4-6.

Abstract for Wang, Z. et al. "Pilot tests of fluid-switcher energy recovery device for seawater reverse osmosis desalination system"; Desalination and Water Treatment; published online Nov. 20, 2012; vol. 48, 2012, Issue 1-3.

Abstract for Yu, L. et al.; "3D numerical simulation on mixing process in ducts of rotary pressure exchanger"; Desalination and Water Treatment; published Apr. 2012; pp. 269-273; vol. 42, 2012.

Abstract for Mei, C.C. et al.; "Theory of isobaric pressure exchanger for desalination"; Desalination and Water Treatment; published Feb. 2012; pp. 112-122; vol. 39, 2012.

Abstract for Rao, R.V. et al. "Design optimization of rotary regenerator using artificial bee colony algorithm" Proceedings of the Institution of Mechanical Engineers, Part A: Journal of Power and Energy; published online Aug. 5, 2011; vol. 225, Issue 8.

Abstract for Penate, B. et al. "Operation of the RO Kinetic® energy recovery system: Description and real experiences"; Desalination, Mar. 2010, pp. 179-185; vol. 252, issue 1-3.

Abstract for Dallaire, J. et al. "Coceptual optimization of a rotary heat exchanger with a porous core"; International Journal of Thermal Sciences; Feb. 2010, pp. 454-462; vol. 49, Issue 2.

Abstract for Al-Hawaj, O.M. "The design aspects of rotary work exchanger for SWRO"; Desalination and Water Treatment; published online Aug. 3, 2012; pp. 131-138; vol. 8, 2009, Issue 1-3.

Abstract for Zhou, Y.H. et al. "Numerical simulation on a dynamic mixing process in ducts of a rotary pressure exchanger for SWRO"; Desalination and Water Treatment; 2009, pp. 107-113; vol. 1, 2009, Issue 1-3.

Abstract for Stover, R.L. "SWRO process simulator"; Desalination, Mar. 2008, pp. 126-135; vol. 221, Issue 1-3.

Abstract for Stover, R.L. "Seawater reverse osmosis with isobaric energy recovery devices"; Desalination, Feb. 2007, pp. 168-175; vol. 203, Issue 1-3.

Abstract for Shang, W. et al. "Effects of Manufacturing Tolerances on Regenerative Exchanger No. of Transfer Units and Entropy Generation"; Journal of Engineering for Gas Turbines and Power; Jul. 2006; pp. 585-598, vol. 128 , Issue 3.

Abstract for Al-Hawaj, O.M. "The work exchanger for reverse osmosis plants"; Desalination, Aug. 2003, pp. 23-27, vol. 157, Issue 1-3.

Macharg, J.P. "Retro-fitting existing SWRO systems with a new energy recovery device"; Desalination Feb. 2003, pp. 253-264; vol. 153, Issue 1-3.

Abstract for Neti, S. et al. "Measurements of effectiveness in a silica gel rotary exchanger"; Applied Thermal Engineering;Mar. 2000; pp. 309-322; vol. 20, Issue 4.

Danfoss User Manual "Installation, Operation and Maintenance Manual" iSave40, isave.danfoss.com, (D10, D17A, D17B), (obtained Aug. 21, 2024), 82 pages.

Danfoss "Technical Sheet—General Information" Energy Recovery iSave 21-40, (D14A and D14B), (published Apr. 2010, Internet access Oct. 30 2012), English and Spanish, 18 pages.

Data sheet "Energy Recovery Device" iSave 21-40, http://www.danfoss.com/NR/rdonlyres/34561873-D281-4CAF-9EC0-82EED05901D0/0/Datasheet, (D18A, D18B, D18C,D14A, D14B, D7), English and Spanish, (published Jan. 2012, obtained Aug. 22, 2024), 29 pages.

Neale, M.J., Excerpt from "Lubrication and Reliability Handbook", (D11), (2001), 14 pages.

Childs, Peter R. N., "Mechanical Design Engineering Handbook", (D12), (2014), 85 pages.

Office Action for European Patent Application No. 15753261, mailed Sep. 2, 2024, 33 pages.

Pikalov V., et al., "Demonstration of an Energy Recovery Device Well Suited for Modular Community-based Seawater Desalination Systems: Result of Danfoss iSave 21 Testing, "Desalination and Water Treatment, (2013), 6 pages.

Danfoss iSave Energy recovery device, screenshots of video titled "Danfoss iSave animation", https://www.youtube.com/watch?v=J81mcTV7tUw (D16). (published Oct. 17, 2011, obtained Aug. 21, 2024) 5 pages.

* cited by examiner

SYSTEMS AND METHODS FOR REPAIRING FLUID HANDLING EQUIPMENT

RELATED APPLICATIONS

This application claims priority to U.S. patent application Ser. No. 14/818,219, filed Aug. 4, 2015, which claims the benefit of U.S. Provisional Patent Application No. 62/033,525, filed Aug. 5, 2014, the contents of which are hereby incorporated by reference in their entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to fluid handling equipment such as hydraulic fracturing equipment.

Well completion operations in the oil and gas industry often involve hydraulic fracturing (often referred to as fracking or fracing) to increase the release of oil and gas in rock formations. Hydraulic fracturing involves pumping a fluid containing a combination of water, chemicals, and proppant (e.g., sand, ceramics) into a well at high pressures. The high-pressures of the fluid initiates and increases crack size and propagation through the rock formation releasing more oil and gas, while the proppant prevents the cracks from closing once the fluid is depressurized. Unfortunately, the proppant in the frac fluid may be abrasive and may increase the wear and maintenance on the hydraulic fracturing equipment.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed in detail below, a frac system (or hydraulic fracturing system) includes a hydraulic energy transfer system that transfers work and/or pressure between first and second fluids, such as a pressure exchange fluid (e.g., a substantially proppant free fluid, such as water) and a hydraulic fracturing fluid (e.g., a proppant-laden frac fluid). The hydraulic energy transfer system may also be described as a hydraulic protection system, a hydraulic buffer system, or a hydraulic isolation system, because it may block or limit contact between a frac fluid and various hydraulic fracturing equipment (e.g., high-pressure pumps) while exchanging work and/or pressure with another fluid. By blocking or limiting contact between various fracturing equipment and the second proppant containing fluid, the hydraulic energy transfer system increases the life/performance while reducing abrasion/wear of various fracturing equipment (e.g., high-pressure pumps). Moreover, it may enable the use of less expensive equipment in the fracturing system by using equipment (e.g., high-pressure pumps) not designed for abrasive fluids (e.g., frac fluids and/or corrosive fluids).

The hydraulic energy transfer system may include a hydraulic turbocharger or a hydraulic pressure exchange system, such as a rotating isobaric pressure exchanger (IPX). The IPX may include one or more chambers (e.g., 1 to 100)

to facilitate pressure transfer and equalization of pressures between volumes of first and second fluids (e.g., gas, liquid, or multi-phase fluid). In some embodiments, the IPX may transfer pressure between a first fluid (e.g., pressure exchange fluid, such as a first proppant free or substantially proppant free fluid) and a second fluid that may be highly viscous and/or contain proppant (e.g., frac fluid containing sand, solid particles, powders, debris, ceramics). However, the frac fluid and/or other corrosive fluids may be abrasive to the IPX and may cause wear to components of the IPX, such as the rotor and end covers of the IPX. In particular, the frac fluid may cause wear to an interface between the rotor and each end cover. For example, abrasive particles in the frac fluid may cause wear to the interface between the rotor and the respective end covers as the rotor rotates relative to the respective end covers. Replacing worn components of the IPX may be costly. Thus, it may be desirable to repair worn components of the IPX. For example, in some embodiments, a worn portion of a component of the IPX, such as the rotor or an end cover, may be removed. In certain embodiments, a replacement portion (e.g., a replacement layer, a replacement end portion, a replacement coating, etc.) may be coupled to the component of the IPX to replace the removed worn portion.

Figure 1:
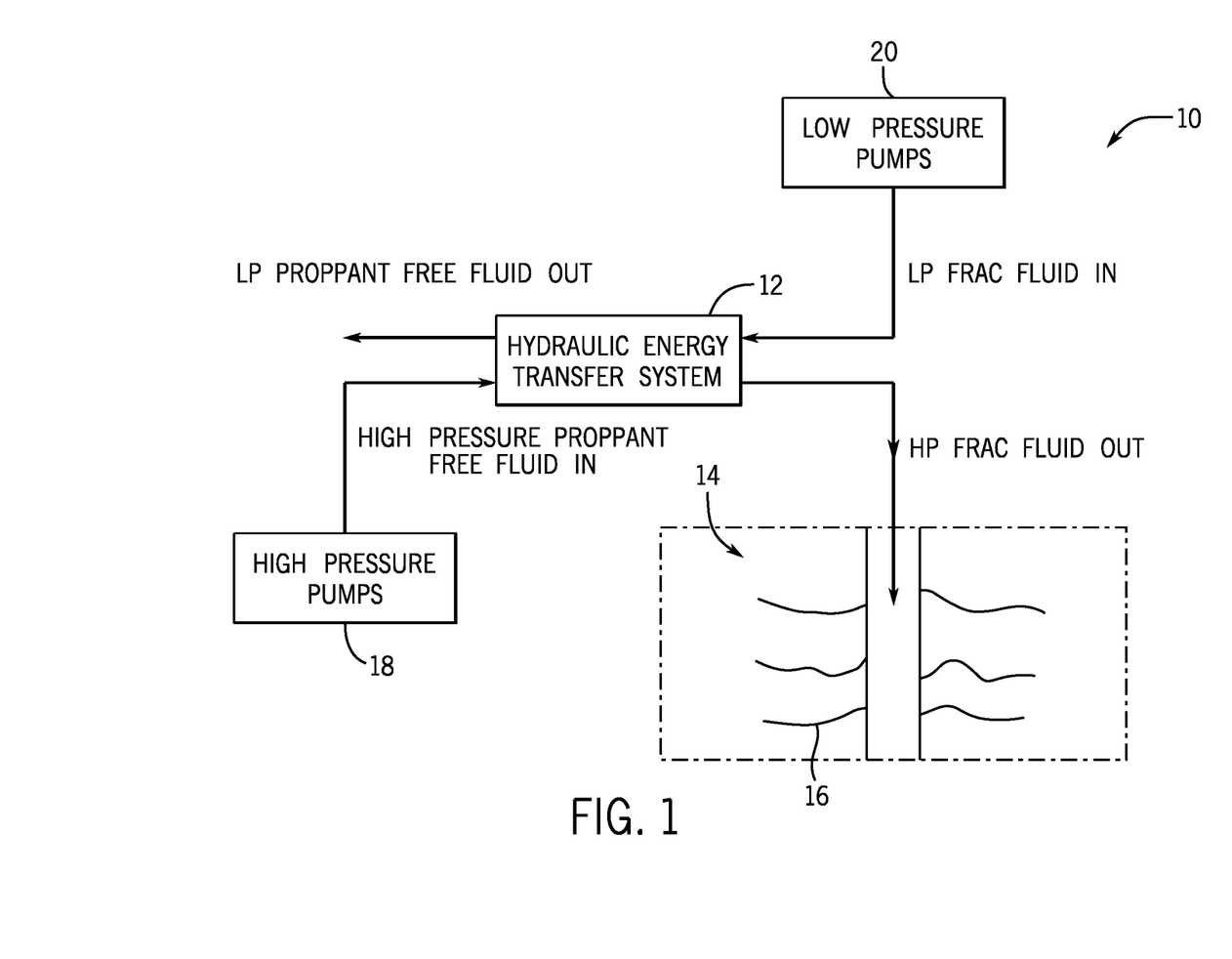
FIG. 1 is a schematic diagram of an embodiment of a frac system with a hydraulic energy transfer system.

FIG. 1 is a schematic diagram of an embodiment of a frac system 10 (e.g., fluid handling system) with a hydraulic energy transfer system 12. For example, during well completion operations, the frac system 10 pumps a pressurized particulate laden fluid that increases the release of oil and gas in rock formations 14 by propagating and increasing the size of cracks 16 in the rock formations 14. In order to block the cracks 16 from closing once the frac system 10 depressurizes, the frac system 10 uses fluids that have solid particles, powders, debris, etc. that enter and keep the cracks 16 open.

In order to pump this particulate laden fluid into the rock formation 14 (e.g., a well), the frac system 10 may include one or more high pressure pumps 18 and one or more low pressure pumps 20 coupled to the hydraulic energy transfer system 12. For example, the hydraulic energy transfer system 12 may be a hydraulic turbocharger or an IPX (e.g., a rotary IPX). In operation, the hydraulic energy transfer system 12 transfers pressures without any substantial mixing between a first fluid (e.g., proppant free fluid) pumped by the high pressure pumps 18 and a second fluid (e.g., proppant containing fluid or frac fluid) pumped by the low pressure pumps 20. In this manner, the hydraulic energy transfer system 12 blocks or limits wear on the high pressure pumps 18, while enabling the frac system 10 to pump a high-pressure frac fluid into the rock formation 14 to release oil and gas. In order to operate in corrosive and abrasive environments, the hydraulic energy transfer system 12 may be made from materials resistant to corrosive and abrasive substances in either the first and second fluids. For example, the hydraulic energy transfer system 10 may be made out of ceramics (e.g., alumina, cermets, such as carbide, oxide, nitride, or boride hard phases) within a metal matrix (e.g., Co, Cr or Ni or any combination thereof) such as tungsten carbide in a matrix of CoCr, Ni, NiCr or Co.

In an embodiment where the hydraulic energy transfer system 12 is a rotary IPX, the first fluid (e.g., high-pressure proppant free fluid) enters a first side of the IPX where the first fluid contacts the second fluid (e.g., low-pressure frac fluid) entering the IPX on a second side. The contact between the fluids enables the first fluid to increase the pressure of the second fluid, which drives the second fluid out of the IPX and down a well for fracturing operations. The first fluid similarly exits the IPX, but at a low pressure after exchanging pressure with the second fluid. As noted above, the second fluid may be a low-pressure frac fluid that may include abrasive particles, which may wear the interface between the rotor and the respective end covers as the rotor rotates relative to the respective end covers.

As used herein, the isobaric pressure exchanger (IPX) may be generally defined as a device that transfers fluid pressure between a high-pressure inlet stream and a low-pressure inlet stream at efficiencies in excess of approximately 50%, 60%, 70%, 80%, 90% or greater without utilizing centrifugal technology. In this context, high pressure refers to pressures greater than the low pressure. The low-pressure inlet stream of the IPX may be pressurized and exit the IPX at high pressure (e.g., at a pressure greater than that of the low-pressure inlet stream), and the high-pressure inlet stream may be depressurized and exit the IPX at low pressure (e.g., at a pressure less than that of the high-pressure inlet stream). Additionally, the IPX may operate with the high-pressure fluid directly applying a force to pressurize the low-pressure fluid, with or without a fluid separator between the fluids. Examples of fluid separators that may be used with the IPX include, but are not limited to, pistons, bladders, diaphragms and the like. In certain embodiments, isobaric pressure exchangers may be rotary devices. Rotary isobaric pressure exchangers (IPXs) 20, such as those manufactured by Energy Recovery, Inc. of San Leandro, CA, may not have any separate valves, since the effective valving action is accomplished internal to the device via the relative motion of a rotor with respect to end covers. Rotary and IPXs may be designed to operate with internal pistons to isolate fluids and transfer pressure with relatively little mixing of the inlet fluid streams. Reciprocating IPXs may include a piston moving back and forth in a cylinder for transferring pressure between the fluid streams. Any IPX or plurality of IPXs may be used in the disclosed embodiments, such as, but not limited to, rotary IPXs, reciprocating IPXs, or any combination thereof. In addition, the IPX may be disposed on a skid separate from the other components of a fluid handling system, which may be desirable in situations in which the IPX is added to an existing fluid handling system.

Figure 2:
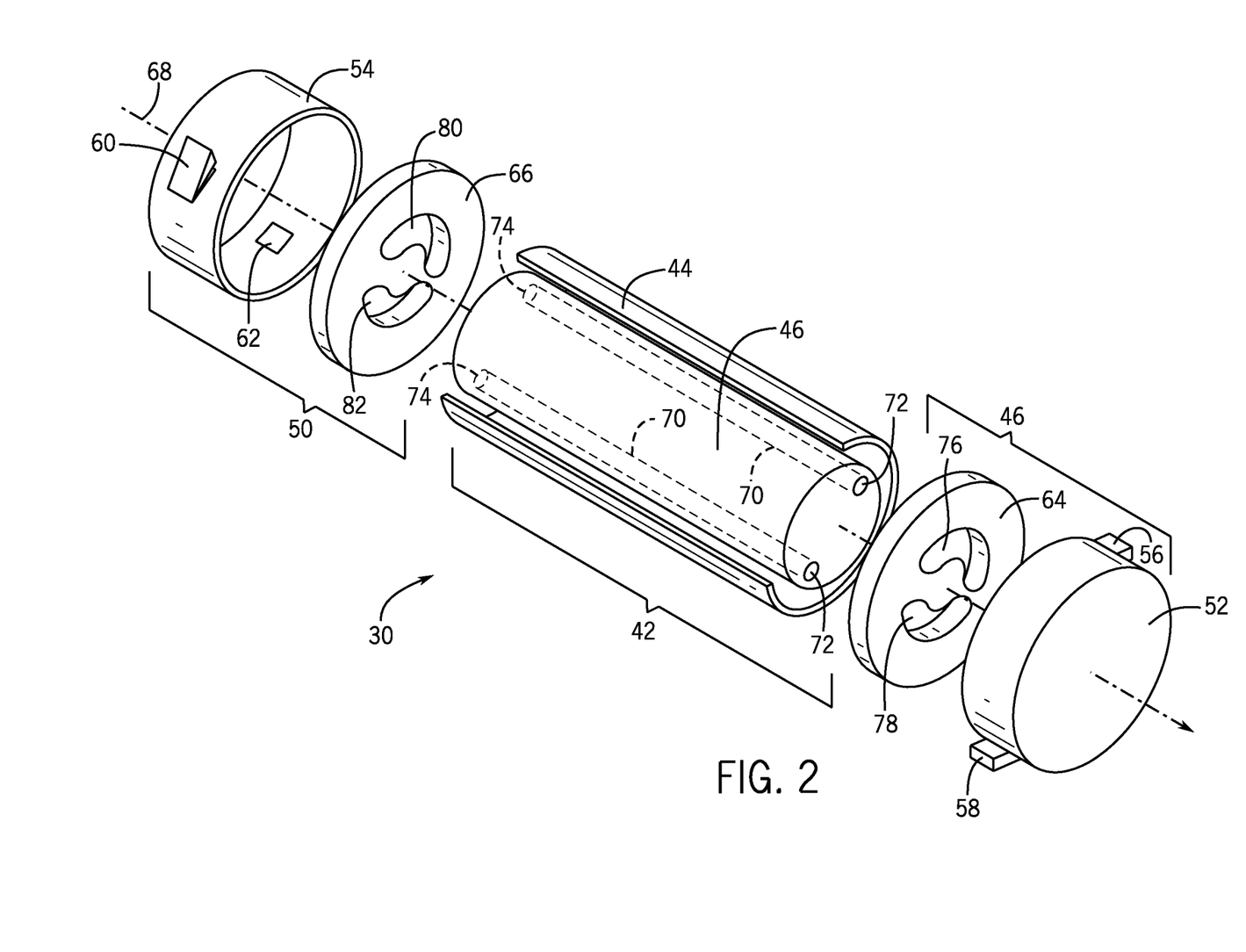
FIG. 2 is an exploded perspective view of an embodiment of a rotary isobaric pressure exchanger (IPX)

FIG. 2 is an exploded view of an embodiment of a rotary IPX 30. In the illustrated embodiment, the rotary IPX 30 may include a generally cylindrical body portion 40 that includes a housing 42 and a rotor 44. The rotary IPX 30 may also include two end structures 46 and 48 that may include manifolds 50 and 52, respectively. Manifold 50 includes inlet and outlet ports 54 and 56 and manifold 52 includes inlet and outlet ports 60 and 58. For example, inlet port 54 may receive a high-pressure first fluid and the outlet port 56 may be used to route a low-pressure first fluid away from the IPX 30. Similarly, inlet port 60 may receive a low-pressure second fluid and the outlet port 58 may be used to route a high-pressure second fluid away from the IPX 30. The end structures 46 and 48 include generally flat end plates (e.g., end covers) 62 and 64, respectively, disposed within the manifolds 50 and 52, respectively, and adapted for fluid sealing contact with the rotor 44. As noted above, one or more components of the IPX 30, such as the rotor 44, the end plate 62, and/or the end plate 64, may be constructed from a wear-resistant material (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more). For example, tungsten carbide may be more durable and may provide improved wear resistance to abrasive fluids as compared to other materials, such as alumina ceramics. Additionally, in some embodiments, one or more components of the IPX 30, such as the rotor 44, the end plate 62, the end plate 64, and/or other sealing surfaces of the IPX 30, may be laminated or may include one or more laminated materials. Further, as will be described in more detail below, replacement portions (e.g., replacement pieces) that may be coupled to components of the IPX 30 to replace removed worn portions. In certain embodiments, the replacement portions may be constructed from one or more wear-resistant materials (e.g., carbide, cemented carbide, silicon carbide, tungsten carbide, etc.) with a hardness greater than a predetermined threshold (e.g., a Vickers hardness number that is at least 1000, 1250, 1500, 1750, 2000, 2250, or more) to provide improved wear resistance.

The rotor 44 may be cylindrical and disposed in the housing 42, and is arranged for rotation about a longitudinal axis 66 of the rotor 44. The rotor 44 may have a plurality of channels 68 extending substantially longitudinally through the rotor 44 with openings 70 and 72 at each end arranged symmetrically about the longitudinal axis 66. The openings 70 and 72 of the rotor 44 are arranged for hydraulic communication with the end plates 62 and 64, and inlet and outlet apertures 74 and 76, and 78 and 80, in such a manner that during rotation they alternately hydraulically expose fluid at high pressure and fluid at low pressure to the respective manifolds 50 and 52. The inlet and outlet ports 54, 56, 58, and 60, of the manifolds 50 and 52 form at least one pair of ports for high-pressure fluid in one end element 46 or 48, and at least one pair of ports for low-pressure fluid in the opposite end element, 48 or 46. The end plates 62 and 64, and inlet and outlet apertures 74 and 76, and 78 and 80 are designed with perpendicular flow cross sections in the form of arcs or segments of a circle.

With respect to the IPX 30, the plant operator has control over the extent of mixing between the first and second fluids, which may be used to improve the operability of the fluid handling system. For example, varying the proportions of the first and second fluids entering the IPX 30 allows the plant operator to control the amount of fluid mixing within the fluid handling system. Three characteristics of the IPX 30 that affect mixing are: the aspect ratio of the rotor channels 68, the short duration of exposure between the first and second fluids, and the creation of a fluid barrier (e.g., an interface) between the first and second fluids within the rotor channels 68. First, the rotor channels 68 are generally long and narrow, which stabilizes the flow within the IPX 30. In addition, the first and second fluids may move through the channels 68 in a plug flow regime with very little axial mixing. Second, in certain embodiments, at a rotor speed of approximately 1200 RPM, the time of contact between the first and second fluids may be less than approximately 0.15 seconds, 0.10 seconds, or 0.05 seconds, which again limits mixing of the streams 18 and 30. Third, a small portion of the rotor channel 68 is used for the exchange of pressure between the first and second fluids. Therefore, a volume of fluid remains in the channel 68 as a barrier between the first and second fluids. All these mechanisms may limit mixing within the IPX 30.

In addition, because the IPX 30 is configured to be exposed to the first and second fluids, certain components of the IPX 30 may be made from materials compatible with the components of the first and second fluids. In addition, certain components of the IPX 30 may be configured to be physically compatible with other components of the fluid handling system. For example, the ports 54, 56, 58, and 60 may comprise flanged connectors to be compatible with other flanged connectors present in the piping of the fluid handling system. In other embodiments, the ports 54, 56, 58, and 60 may comprise threaded or other types of connectors.

FIGS. 3-6 are exploded views of an embodiment of the rotary IPX 30 illustrating the sequence of positions of a single channel 68 in the rotor 44 as the channel 68 rotates through a complete cycle, and are useful to an understanding of the rotary IPX 30. It is noted that FIGS. 3-6 are simplifications of the rotary IPX 30 showing one channel 68 and the channel 68 is shown as having a circular cross-sectional shape. In other embodiments, the rotary IPX 30 may include a plurality of channels 68 with different cross-sectional shapes. Thus, FIGS. 3-6 are simplifications for purposes of illustration, and other embodiments of the rotary IPX 30 may have configurations different from that shown in FIGS. 3-6. As described in detail below, the rotary IPX 30 facilitates a hydraulic exchange of pressure between two fluids by putting them in momentary contact within a rotating chamber. In certain embodiments, this exchange happens at a high speed that results in very high efficiency with very little mixing of the fluids.

Figures 3, 4, 5, 6:
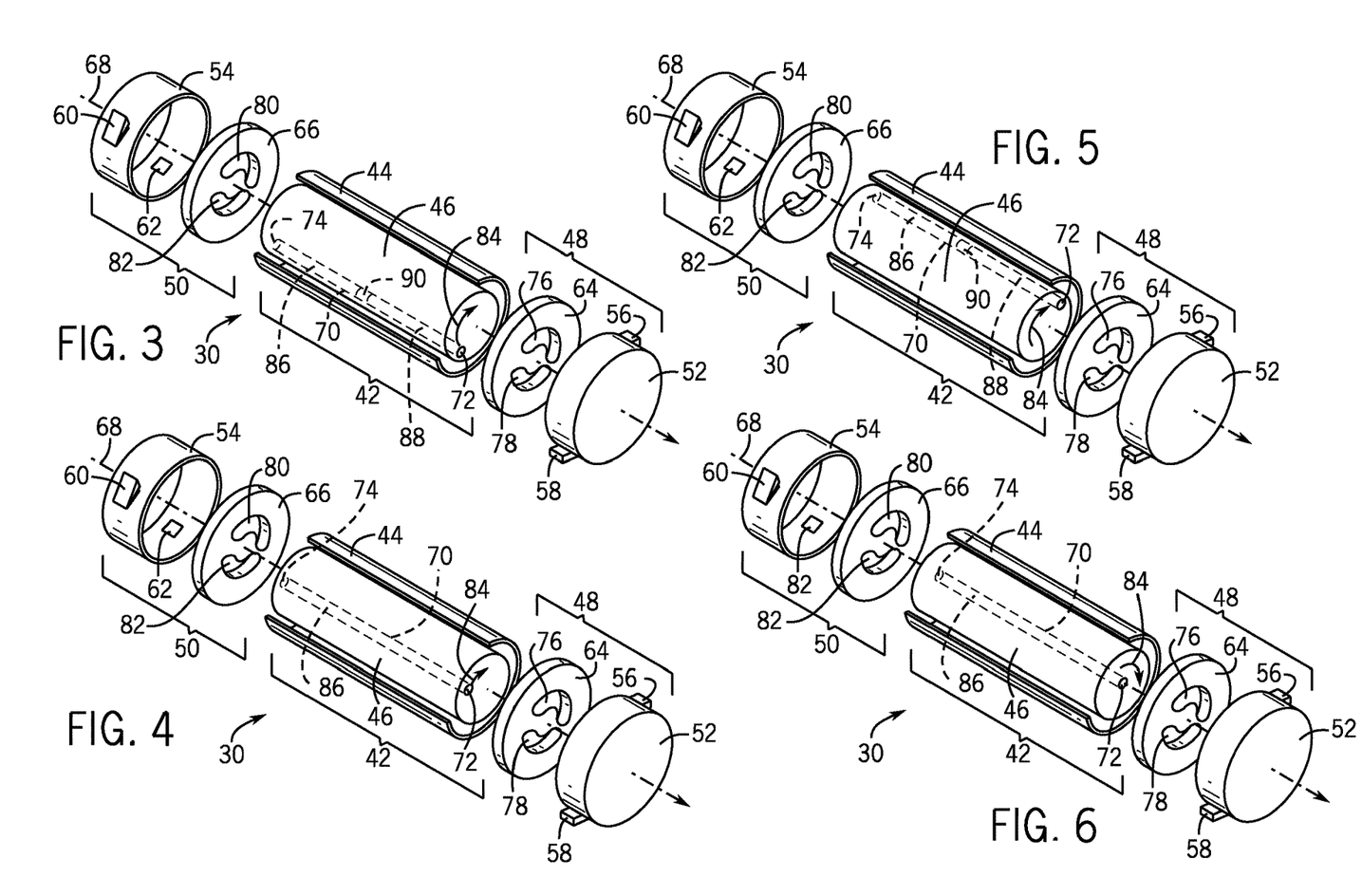
FIG. 3 is an exploded perspective view of an embodiment of a rotary IPX in a first operating position.
FIG. 4 is an exploded perspective view of an embodiment of a rotary IPX in a second operating position.
FIG. 5 is an exploded perspective view of an embodiment of a rotary IPX in a third operating position.
FIG. 6 is an exploded perspective view of an embodiment of a rotary IPX in a fourth operating position.

In FIG. 3, the channel opening 70 is in hydraulic communication with aperture 76 in endplate 62 and therefore with the manifold 50 at a first rotational position of the rotor 44, while opposite channel opening 72 is in hydraulic communication with the aperture 80 in endplate 64, and thus, in hydraulic communication with manifold 52. As discussed below, the rotor 44 rotates in the clockwise direction indicated by arrow 90. As shown in FIG. 3, low-pressure second fluid 92 passes through end plate 64 and enters the channel 68, where it pushes first fluid 94 out of the channel 68 and through end plate 62, thus exiting the rotary IPX 30. The first and second fluids 92 and 94 contact one another at a dynamic interface 96 where minimal mixing of the fluids occurs because of the short duration of contact.

In FIG. 4, the channel 68 has rotated clockwise through an arc of approximately 90 degrees, and outlet 72 is now blocked off between apertures 78 and 80 of end plate 64, and outlet 70 of the channel 68 is located between the apertures 74 and 76 of end plate 62 and, thus, blocked off from hydraulic communication with the manifold 50 of end structure 46. Thus, the low-pressure second fluid 92 is contained within the channel 68.

In FIG. 5, the channel 68 has rotated through approximately 180 degrees of arc from the position shown in FIG. 3. Opening 72 is in hydraulic communication with aperture 78 in end plate 64 and in hydraulic communication with manifold 52, and the opening 70 of the channel 68 is in hydraulic communication with aperture 74 of end plate 62 and with manifold 50 of end structure 46. The fluid in channel 68, which was at the pressure of manifold 52 of end structure 48, transfers this pressure to end structure 46 through outlet 70 and aperture 74, and comes to the pressure of manifold 50 of end structure 46. Thus, high-pressure first fluid 94 pressurizes and displaces the second fluid 92.

In FIG. 6, the channel 68 has rotated through approximately 270 degrees of arc from the position shown in FIG. 3, and the openings 70 and 72 of channel 68 are between apertures 74 and 76 of end plate 62, and between apertures 78 and 80 of end plate 64. Thus, the high-pressure first fluid 94 is contained within the channel 68. When the channel 68 rotates through approximately 360 degrees of arc from the position shown in FIG. 3, the second fluid 92 displaces the first fluid 94, restarting the cycle. Unfortunately, abrasive particles in the frac fluid may enter an interface between the rotor 44 and the end plate 62 and/or an interface between the rotor 44 and the end plate 64, which may result in wear to the rotor 44 and the end plates 62 and 64 as the rotor 44 rotates.

Figure 7:
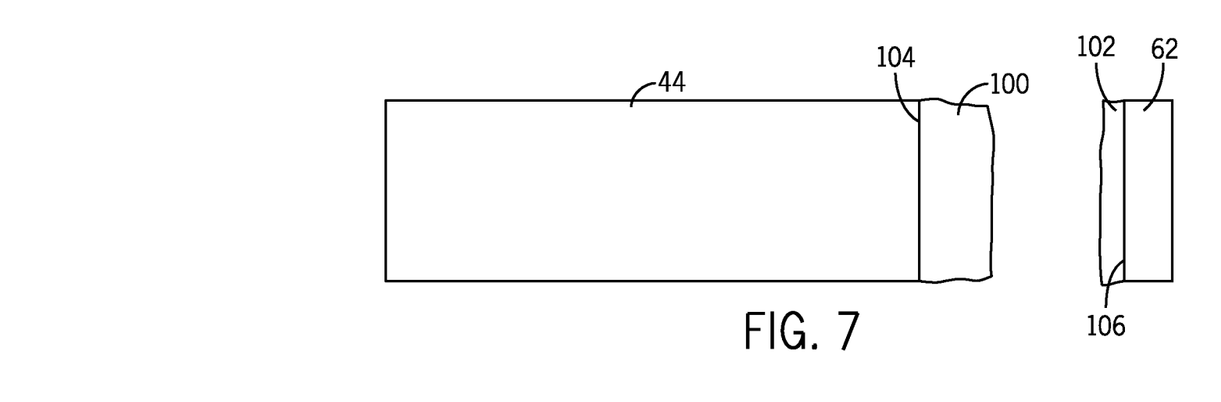
FIG. 7 is a side view of an embodiment of a rotor of a rotary IPX including a worn portion and an end cover of the rotary IPX including a worn portion.

FIG. 7 is a cross-sectional view of the rotor 44 having a worn end portion 100 (e.g., a longitudinal or axial end portion) and the end plate 62 having a worn end portion 102 (e.g., a longitudinal end portion or axial end portion). Worn end portions 100 and 102 are each illustrated with rough lines to define the respective worn portion. For example, the worn end portions 100 and 102 may each include at least one surface of an interface region between the rotor 44 and the end plate 62 (e.g., an interface region that enables fluid sealing contact between the end plate 62 and the rotor 44). It should be noted that while the worn end portions are illustrated on only one end of the rotor 44 and end plate 62, it should be appreciated that other portions (e.g., opposite ends of the rotor and end plate 62) of the rotor 44 and the end plate 62 and 64 may be worn and subject to repair. Further, one or more surfaces of the end plate 64 or other components of the IPX 30 may also be worn and subject to repair using the techniques disclosed herein.

Figure 8:
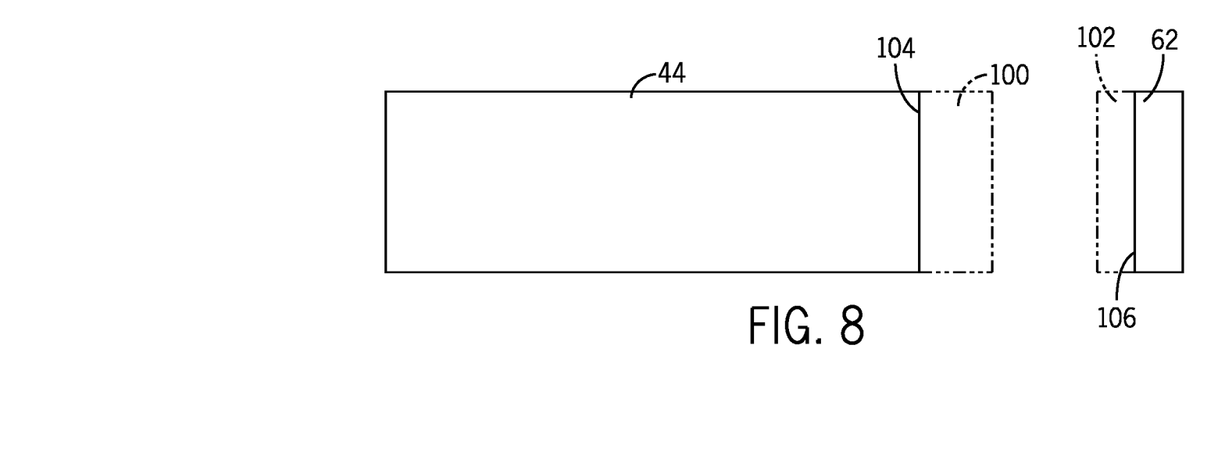
FIG. 8 is a side view of an embodiment of the rotor of the rotary IPX of FIG. 7 with the worn portion removed and the end cover of the rotary IPX of FIG. 7 with the worn portion removed.

In certain embodiments, to repair the rotor 44 and the end plates 62 and 64, the worn portions may be removed. For example, the worn end portions 90 and 92 may be removed along a cutline 104 and 106, respectively. In certain embodiments, the worn end portions 100 and 102 may be removed by any suitable mechanical machining methods, such turning, milling, and/or grinding. In other embodiments, the worn end portions 100 and 102 may be removed by electrical discharge machining (EDM), laser cutting, water jet cutting, and/or electrochemical machining (ECM) or using a diamond tool on a milling machine or diamond grinder. FIG. 8 is a cross-sectional view of the rotor 44 and the end plate 62 with the respective worn end portions 100 and 102 removed along the respective cut lines 104 and 106, as illustrated by the dashed lines. As will be described in more detail below, a new end portion (e.g., a replacement end portion) may couple to surface 108 of the rotor 44 and/or to surface 110 of the end plate 62.

Figure 9:
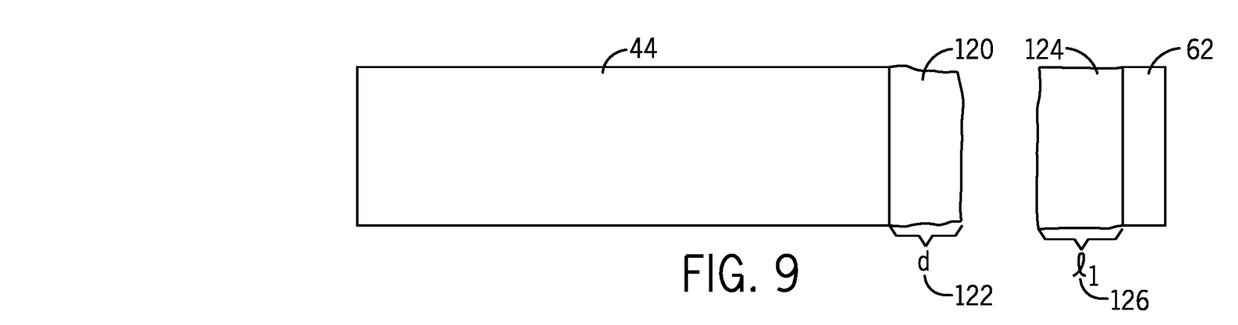
FIG. 9 is a side view of an embodiment of the rotor and an end cover of a rotary IPX.

In some embodiments, a worn portion may be removed from one component of the rotary IPX 30 (e.g., the rotor 44, the end plate 62, or the end plate 64) and a replacement portion may be provided for another component of the rotary IPX 30. As will be described in more detail below, the replacement portion may be coupled to a component of the rotary IPX 30 via brazing, fusing, additive manufacturing techniques, and/or mechanical locking mechanisms. For example, a worn portion may be removed from the rotor 44 and rather than providing a replacement end portion for the rotor 44, a replacement end portion for an end plate (e.g., the end plate 62 or the end plate 64) may be provided with a length to accommodate the machining of the rotor 44. Similarly, in some embodiments, a worn portion may be removed from an end plate (e.g., the end plate 62 or 64), and a replacement end portion may be provided for the rotor 44 to accommodate the machining of the end plate. For example, as illustrated in FIG. 9, the rotor 44 may include a worn end portion 120 with a distance 122 (i.e., $d_1$) that may be removed from the rotor 44. A replacement end portion 124 may be coupled to the end plate 62 or 64 with a length 126 (i.e., $l_1$) that is equal to the distance 122. Thus, the replacement end portion 124 includes a length to accommodate the machining of the rotor 44. It should be appreciated that any suitable distance may be added on to the rotor 44, the end plate 62, and/or the end plate 64. That is, replacement end portions may be provided to accommodate the removal of different lengths of the rotor 44 or the end plates 62 and 64. Further, in one embodiment, a replacement end portion may couple to an end plate to accommodate the removal of a worn portion from the rotor 44 and the removal of a worn portion from the end plate or vice versa.

Figure 10:
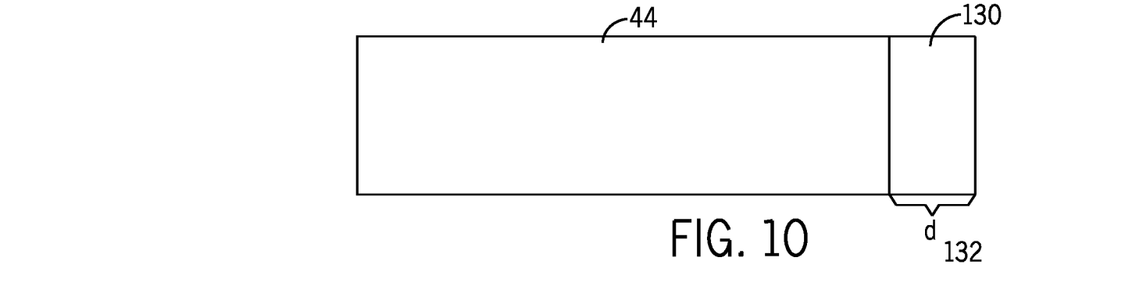
FIG. 10 is a side view of an embodiment of a rotor with a removable end portion.

In other embodiments, the rotor 44 and/or the end plates 62 and 64 may be manufactured with removable end portions having fixed distances. For example, as illustrated in FIG. 10, the rotor 44 may include a removable end portion 130 having a fixed distance 132 (e.g., fixed length) that is detachably connected to the rotor 44 (e.g., at fixed or preset location about the rotor 44). That is, the removable end portion 130 may be removed from the rotor without requiring any cutting methods (e.g., turning, milling, grinding, EDM, laser cutting, water jet cutting, ECM, etc.). While the illustrated embodiment relates to the rotor 44, it should be appreciated that the present techniques are also applicable to the end plates 62 and 64. In some embodiments, the removable end portion 130 may be detached from the rotor 44 when only a portion of the removable end portion 130 is worn. Providing removable end portions 130 with fixed distances facilitates the removal of worn portions from the rotor 44 (or end plates 62 and 64) while enabling mass production of replacement end portions (e.g., replacement pieces). For example, the replacement end portions may be manufactured with the same dimensions (e.g., the same structure) as the removable end portions 130 (e.g., before the removable end portions 130 are worn). In this manner, the replacement end portions may function in substantially the same manner as the removable end portions 103 (e.g., before the removable end portions 103 are worn). Further, in some embodiments, the replacement end portions may be manufactured with the same material or materials as the removable end portions 130. In other embodiments, the replacement end portions may be manufactured with dimensions (e.g., sized differently to account for overall wear and use of machine) and/or materials that are different (e.g., wear-resistant materials) from the removable end portions 130.

Figure 11:
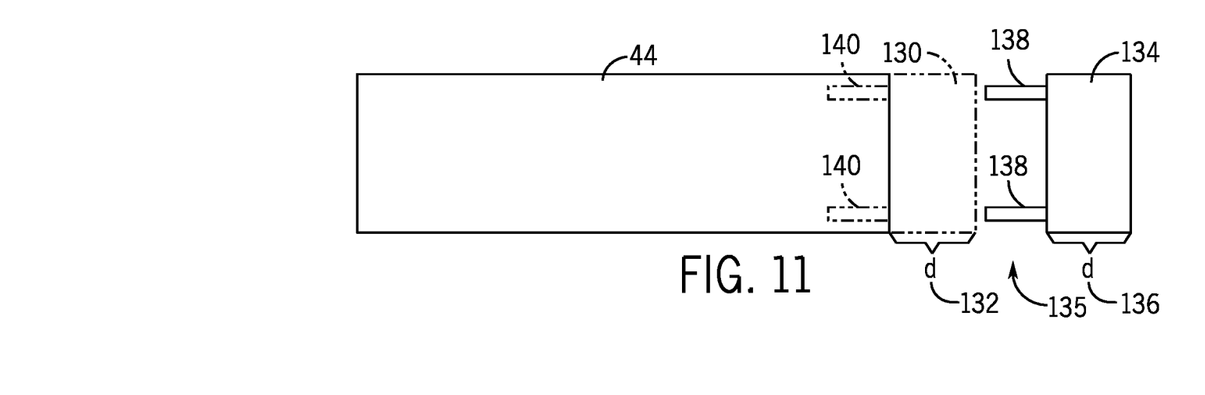
FIG. 11 is a side view of an embodiment of the rotor of FIG. 10 with the removable end portion removed and a replacement end portion.

FIG. 11 illustrates a cross-sectional view of the rotor 44 with the removable end portion 130 removed and a replacement end portion 134 configured to couple to the rotor 44 with a mechanical locking mechanism 135. The replacement end portion 134 has a distance 136 that is equal to the distance 132 of the removed end portion 130. In some embodiments, the mechanical locking mechanism 135 may include one or more releasable connecting elements 138 on the replacement end portion 134 that are configured to releasably engage with one or more complementary connecting elements 140 of the rotor 44 to releasably connect the replacement end portion 134 to the rotor 44. As illustrated, the connecting elements 138 may be protruding elements, such as threaded fasteners (e.g., bolts or screws), pins, hooks, snap-fit structures, or any combination thereof. In such embodiments, the complementary connecting elements 140 may include recessed portions, which may be smooth or threaded, configured to mate with the connecting elements 140. It should be appreciated that in other embodiments, the rotor 44 may include protruding elements and the replacement end portion 134 may include recessed portions. In some embodiments, the replacement end portion 134 may be configured to be releasably coupled to the rotor 44 via a friction fit.

In other embodiments, the new replacement end portion 134 may be manufactured and coupled to the respective component of the IPX 30 (e.g., the rotor 44, the end plate 62, or the end plate 64). In some embodiments, the replacement end portion 134 may be manufactured with a length equal to the length of a removed worn end portion (e.g., a removable end portion 130). In certain embodiments, a plurality of replacement end portions 134 with a plurality of different lengths may be manufactured to accommodate the removal of worn portions (e.g., removable end portions 130) of different lengths. For example, a replacement end portion 134 with a desired size (e.g., length, diameter, etc.) may be selected from a plurality of replacement end portions 134 of different sizes (e.g., length, diameter, etc.) based on the size (e.g., length, diameter, etc.) of the worn portion to be removed.

Figure 12:
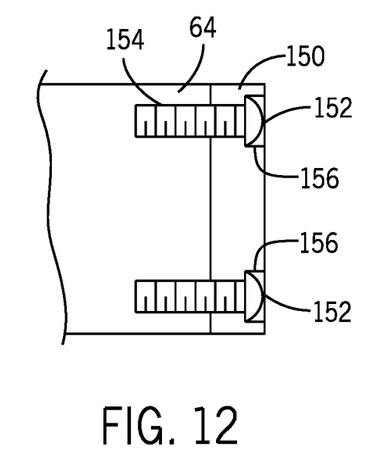
FIG. 12 is a cross-sectional view of an embodiment of an end cover of a rotary IPX coupled to a replacement end portion with a mechanical locking mechanism.

In FIG. 12, the mechanical locking mechanism 135 may include mechanical connecting elements 152 (e.g., bolts, pins, screws, hooks, snap-fit structures, etc.). As illustrated, the mechanical connecting elements 152 may be inserted into one or more recesses 154 of the end plate 64 and one or more apertures 155 (e.g., through holes) of the replacement end portion 150. In some embodiments, the replacement end portion 150 may also include one or more counterbores 156. However, in other embodiments, the mechanical connecting elements 152 may be coupled to or integral with the replacement end portion 150 (e.g., a threaded portion) and may be inserted into the recesses 154 of the end plate 64. In some embodiments, the end plate 64 may be prefabricated to include the recesses 154. Alternatively, the end plate 64 may be machined (e.g., via drilling, EDM, laser cutting, water jet cutting, ECM, etc.) to include the recesses 154 after a worn end portion is removed. It should be appreciated that the mechanical connecting elements 152 may also be provided for the rotor 44 and/or the end plate 62. That is, the rotor 44 and/or the end plate 62 may include the recesses 154 for the mechanical connecting elements 152.

As illustrated, the mechanical connecting elements 152 may be recessed within the replacement end portion 150 (e.g., disposed within the counterbores 156) to facilitate the rotation of the rotor 44. In other embodiments, the mechanical connecting elements 152 may protrude past the replacement end portion and may be configured to fit within a circumferential groove of the rotor 44. As such, the mechanical connecting elements 152 may not disrupt the rotation of the rotor 44.

Figure 13:
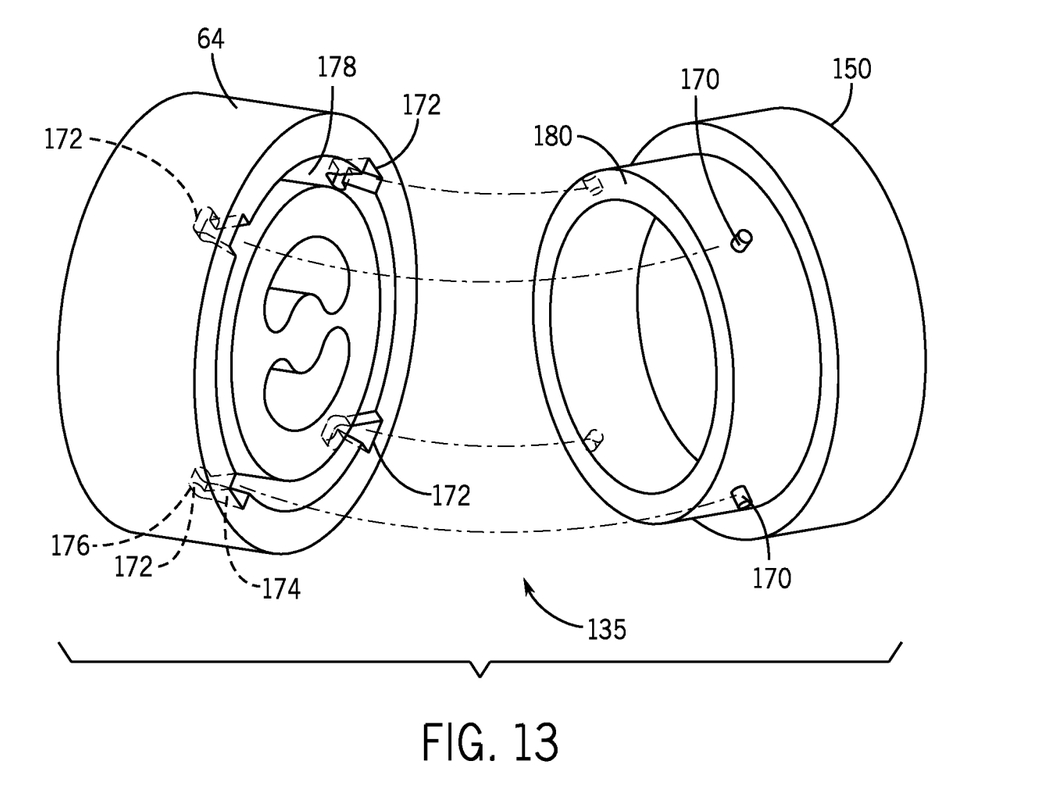
FIG. 13 is perspective view of an embodiment of an end cover of a rotary IPX configured to be coupled to a replacement end portion with a mechanical locking mechanism.

In other embodiments, the replacement end portion 150 may be configured to couple to the end plate 64 via a mechanical locking mechanism, such as a bayonet connection, a twist lock, or the like. For example, as illustrated in FIG. 13, the replacement end portion 150 may include one or more bayonet projections 170 configured to be rotatably secured within one or more bayonet grooves 172 of the end plate 64. As illustrated, the grooves 172 may be generally L-shaped, such that the projections 170 enter in an axial direction through an axial portion 174 of the L-shape and then turn in a circumferential direction and become secured within a circumferential portion 176 of the L-shape when the replacement end portion 150 is rotated relative to the end plate 64. To facilitate the bayonet connection, the end plate 64 may be machined to include the grooves 172 and, in some embodiments, may be machined to include a recessed portion 178 that is configured to receive a projecting portion 180 of the replacement end portion 150. It should be appreciated that the illustrated embodiment is one possible embodiment of a mechanical locking mechanism, and other mechanical locking mechanisms may be used.

Figure 14:
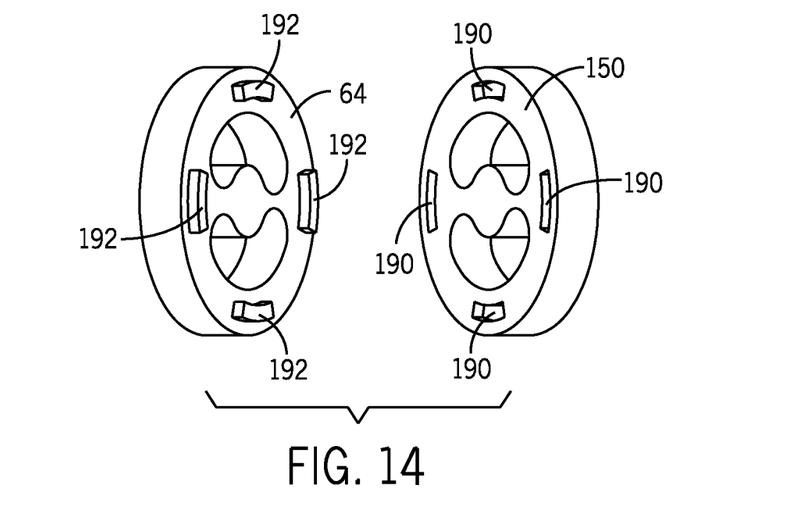
FIG. 14 is a side view of an embodiment of an end cover of a rotary IPX configured to form a friction fit with a replacement end portion.

In some embodiments, the replacement end portion 150 may be configured to couple to the end plate 64 via a friction fit or interference fit. For example, as illustrated in FIG. 14, the replacement end portion 150 may include one or more projections 190 (e.g., tab projections) that may form a friction fit connection or interference connection with one or more corresponding recesses 192 (e.g., slots) of the end plate 64. As noted above, the end plate 64 may be prefabricated with the recesses 192 or may be machined using any suitable cutting technique to form the recesses 192. In other embodiments, the end plate 64 may include the projections 190 and the replacement end portion 150 may include the recesses 192. Once each projection 190 is fitted with a respective recess 192, friction at the interface between the projection 190 and recess 192 holds the replacement end portion 150 and the end plate 64 in a fixed relative position until the replacement end portion 150 and end plate 64 are moved apart and the projection 190 is removed from the recess 192.

Figure 15:
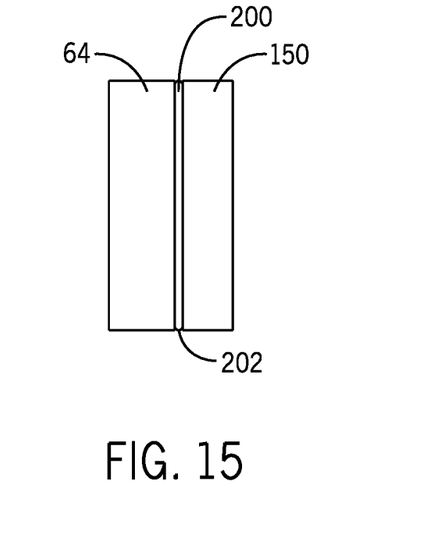
FIG. 15 is a cross-sectional view of an embodiment of an end cover of a rotary IPX coupled to a replacement end portion via a brazing joint.

The replacement end portion 150 may also be coupled to the end plate 64 via a brazed joint 200, as illustrated in FIG. 15. The brazed joint 200 may be a butt joint or a lap joint. In some embodiments, the brazing material may be applied over the entire interface 202 between the replacement end portion 150 and the end plate 64 such that the brazed joint 200 integrally bonds the replacement end portion 150 and the end plate 64 along the entire interface 202, as illustrated. In other embodiments, the brazing material may be applied to a portion of the interface 202. Additionally, in some embodiments, the replacement end portion 150 may be fused to the end plate 64 or to another component of the IPX 30. In such embodiments, the replacement end portion 150 may be fused to the end plate 60 without the addition of a brazing material or brazing alloy. In particular, the replacement end portion 150 may be placed adjacent to the end plate 64 (e.g., on top of the end plate 64), and a load may be applied to the replacement end portion 150 and the end plate 64 inside a vacuum at a predetermined temperature while the replacement end portion 150 is adjacent to the end plate 64, which may fuse the replacement end portion 150 to the end plate 64. For example, in one embodiment, the replacement end portion 150 and the end plate 64 may be manufactured from tungsten carbide, and the replacement end portion 150 and the end plate 62 may be fused together to form a cohesive, seamless bond when exposed to a high temperature and a load within a vacuum. Further, in some embodiments, the replacement end portion 150 may be welded to the end plate 64 or to another component of the rotary IPX 30.

It should be appreciated that while the embodiments described above with respect to FIGS. 12-15 relate to the end plate 64, the present techniques may also be applied to the rotor 44, the end plate 62, and/or any other suitable component of the IPX 30. Thus, a replacement end portion (e.g., replacement end portion 134, replacement end portion 150) may be coupled to a component of the IPX 30 (e.g., the rotor 44, the end plate 62, or the end plate 64) after removing a worn end portion. However, in some embodiments, the replacement end portion (e.g., placement end portion 134, replacement end portion 15) may be coupled to a component of the IPX 30 (e.g., the rotor 44, the end plate 62, or the end plate 64) without removing a worn end portion. Additionally, the replacement end portion 134, 150 may be coupled to the component of the IPX using any suitable attachment techniques. For example, the replacement end portion 134, 150 may be coupled to the respective component using a mechanical locking mechanism, a friction fit connection, or a brazing joint. In some embodiments, the replacement end portion 134, 150 may be manufactured including the desired features of the respective component. For example, a replacement end portion 134, 150 for the end plate 62 or 64 may be manufactured to include one or more oblique ramps that form surfaces of the expanding passageways 74 and 76 of the end plate 62 or 64. In some embodiments, the replacement end portion 134, 150 may be manufactured (e.g., machined) using any suitable techniques to form the desired features (e.g., ramps) after the replacement end portion is coupled to the respective component of the IPX 30.

Figure 16:
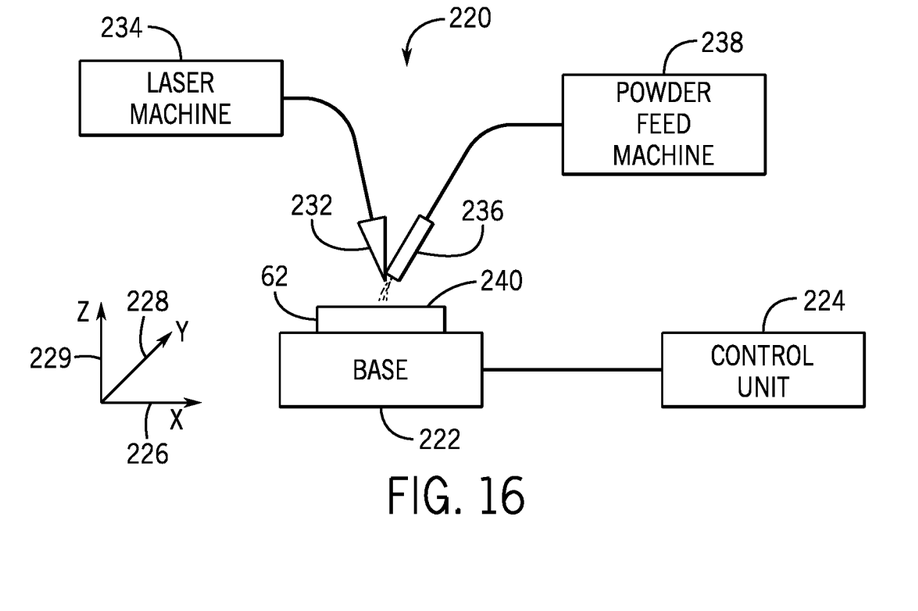
FIG. 16 is a schematic diagram of an embodiment of an additive manufacturing system configured to repair a component of a rotary IPX.

In other embodiments, the rotor 44, the end plates 62 and 64, and/or other components of the IPX 30 may be repaired using additive manufacturing techniques (e.g., 3D printing). In some embodiments, the rotor 44, the end plates 62 and 64, and/or other components of the IPX 30 may be repaired using additive manufacture techniques after a worn portion is removed from the respective component. In other embodiments, the rotor 44, the end plates 62 and 64, and/or other components of the IPX 30 may be repaired using additive manufacturing without removing a worn portion of the respective component. In certain embodiments, components of the IPX 30 may be repaired using selective laser sintering or laser engineered net shaping (e.g., laser powder forming). As illustrated in FIG. 16, an additive manufacturing system 220 may be used to repair one or more components of the IPX 30. The system 220 includes a base 222 (e.g., a workpiece clamp, mount, or holding assembly) configured to hold a component of the IPX 30 (e.g., the end plate 62 in the illustrated embodiment). The base 222 is controlled by a control unit 224, which may control the movement of the base 222 along x-axis 226, y-axis 228, and z-axis 229, as well as the rotational of the base 222. The system 220 includes one or more laser nozzles 232 controlled by a laser machine 234. Additionally, the system 220 includes one or more powder delivery tubes 236 controlled by powder feeder machine 238.

In one embodiment, the laser machine 234 may direct a laser beam using the laser nozzle 232 to create a melt pool over surface 240 of the end plate 62. However, it should be appreciated that in other embodiments, different sources of focused energy may be used to create the melt pool. The laser machine 238 may deposit a powder of wear-resistant material (e.g., a carbide binder powder, a tungsten carbide binder powder, a silicon binder powder, a cemented carbide binder powder, etc.) via the powder delivery tube 236 into the melt pool to fuse particles of the powder to the surface 240 (e.g., to create a layer of fused tungsten carbide). The process may be repeated to create additional layers of fused tungsten carbide. The laser machine 234 and powder feed machine 238 may be controlled by the control unit 224 or other suitable processor-based device configured to implement a computer aided design (CAD) model of a repaired portion of the end plate 62. Repairing components of the IPX 30 using additive manufacturing may be desirable in certain embodiments because the components may be manufactured to include the desired features (e.g., ramps) using a CAD model. Thus, the component does not require later machining to include such features.

Figure 17:
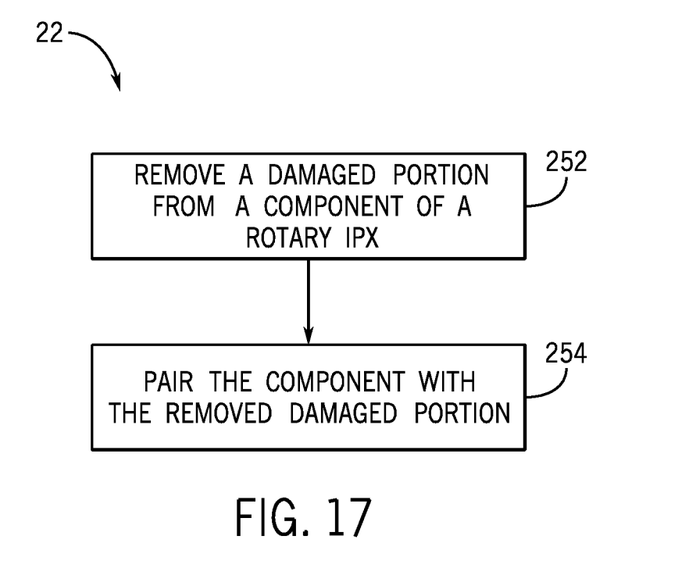
FIG. 17 is a process flow diagram of a method for repairing components of a rotary IPX system.

FIG. 17 is a flow chart of a method 250 that may be used to repair components of the IPX 30, such as the rotor 44 and the end plates 62 and 64. The method 250 includes removing a worn portion from a component of the IPX 30 (block 252). As set forth above, in certain embodiments, a component may be prefabricated to include removable portions at fixed distances. As such, worn portions may be removed by removing the removable portions. In other embodiments, worn portions (e.g., that are otherwise fixed) may be removed gradually by turning, milling, grinding, drilling, EDM, laser cutting, water jet cutting, ECM, etc.

The method 250 also includes repairing the component having the removed worn portion (block 254). In some embodiments, repairing the component may include coupling a replacement portion to the component. The replacement portion may be a prefabricated replacement portion (e.g., to replace the removable portion). In some embodiments, the replacement portion may be manufactured to include a length corresponding to the length of the removed worn portion. As set forth above, the replacement portion may be coupled to a component of the IPX 30 via a friction fit or interference fit. In some embodiments, the replacement portion may be coupled to a component of the IPX 30 using one or more mechanical attachment features, such as bolts, pins, screws, snap-fit connections, hooks, or the like. The replacement portion may also be coupled to a component of the IPX 30 via brazing, welding, and/or fusing. Further, in some embodiments, repairing the component may include using additive manufacturing techniques to integrally repair the component. Additionally, in some embodiments, repairing the component may include using a rotary IPX repair system, such as the additive manufacturing system 220, a system configured to braze the replacement portion to the component (e.g., a brazing system), a system configured to fuse the replacement portion to the component (e.g., a vacuum fusing system), a welding system, and/or a system configured to couple the replacement portion to the component. Additionally, in some embodiments, the component may be repaired without removing the worn portion. For example, the replacement portion may be coupled to the component without removing the replacement portion. Additionally, additive manufacturing techniques may be used to repair the component without removing the worn portion.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
removing a worn portion from a first end face of a component of a rotary pressure exchanger, the component being a rotor or an end cover, wherein the rotary pressure exchanger is configured to exchange pressures between a first fluid and a second fluid, wherein the worn portion is a substantially cylindrical shape, wherein a distal end surface of the substantially cylindrical shape spans from a first radial side of the component to a second radial side of the component, wherein the component includes a removable end portion that has a fixed length and that is detachably connected to a body of the component; and
coupling a first end face of a component replacement piece of the rotary pressure exchanger to the first end face of the component to replace the worn portion, wherein the component forms a first plurality of apertures configured to align with a second plurality of apertures of the component replacement piece, wherein a manifold of the rotary pressure exchanger is fluidly coupled to the component, and wherein the manifold comprises a fluid chamber, an inlet port, and an outlet port configured to transfer one of the first fluid or the second fluid.

2. The method of claim 1, wherein:
the removable end portion comprises the worn portion;

the component is the rotor, the rotary pressure exchanger further comprising the end cover, and the worn portion comprises the distal end surface on the rotor in a corresponding interface region between the rotor and the end cover; or the component is the end cover, the rotary pressure exchanger further comprising the rotor, and the worn portion comprises the distal end surface on the end cover in a respective interface region between the rotor and the end cover.

3. The method of claim 1, wherein the removing of the worn portion comprises removing a prefabricated removable portion from the component.

4. The method of claim 1, wherein the first plurality of apertures comprises a first inlet aperture and a first outlet aperture, wherein the second plurality of apertures comprises a second inlet aperture and a second outlet aperture, and wherein the coupling of the component replacement piece to the component is by mechanically locking the component replacement piece to the component by mating one or more connecting portions of the component replacement piece with one or more complementary connecting portions of the component.

5. The method of claim 1, wherein the first plurality of apertures comprises a first inlet aperture and a first outlet aperture, wherein the second plurality of apertures comprises a second inlet aperture and a second outlet aperture, and wherein the coupling of the component replacement piece to the component is by brazing, fusing, or welding the component replacement piece to the component.

6. A method comprising:
removing a worn portion from a first end face of a rotor of a rotary pressure exchanger, wherein the rotary pressure exchanger is configured to exchange pressures between a first fluid and a second fluid, wherein the rotor is configured to rotate within a cylindrical body portion of the rotary pressure exchanger and about a longitudinal axis disposed along a center of the rotor, wherein the rotor comprises a plurality of channels disposed between the first end face of the rotor and a second end face of the rotor, wherein the worn portion is a substantially cylindrical shape, wherein a distal end surface of the substantially cylindrical shape spans from a first radial side of the rotor to a second radial side of the rotor, the rotor including a removable end portion that has a fixed length and that is detachably connected to a body of the rotor; and coupling a first end face of a rotor replacement piece of the rotary pressure exchanger to the first end face of the rotor to replace the worn portion, wherein the rotor replacement piece forms a first plurality of apertures configured to align with the plurality of channels of the rotor to receive the first fluid or the second fluid, wherein a manifold of the rotary pressure exchanger is fluidly coupled to the rotor, and wherein the manifold comprises a fluid chamber, an inlet port, and an outlet port configured to transfer one of the first fluid or the second fluid.

7. The method of claim 6, wherein the rotor replacement piece comprises a material that has a first wear resistance that is different than a second wear resistance of the rotor.

8. The method of claim 6, wherein the first plurality of apertures comprises a first inlet aperture and a first outlet aperture, and wherein the rotor replacement piece is configured to couple to the rotor via a friction fit.

9. The method of claim 6, wherein the rotor replacement piece defines a contact face configured to contact the first end face of the rotor, wherein the contact face defines a first perimeter that matches a second perimeter of the first end face of the rotor.

10. A method comprising:
removing a worn portion of a first end face of an end plate of a rotary pressure exchanger, wherein the worn portion is a substantially cylindrical shape, wherein a distal end surface of the substantially cylindrical shape spans from a first radial side of the end plate to a second radial side of the end plate, the end plate including a removable end portion that has a fixed length and that is detachably connected to a body of the end plate; and coupling a first end face of an end plate replacement piece of the rotary pressure exchanger to the first end face of the end plate to replace the worn portion, wherein the end plate forms a first plurality of apertures configured to align with a second plurality of apertures of the end plate replacement piece, wherein a manifold of the rotary pressure exchanger is coupled to and extends over a second end face of the end plate, wherein the manifold comprises a fluid chamber, an inlet port, and an outlet port configured to transfer one of a first fluid or a second fluid.

11. The method of claim 10 further comprising:
coupling a second end face of the end plate replacement piece to a first end of a cylindrical body portion of the rotary pressure exchanger to provide fluid sealing contact with a rotor replacement piece of the rotary pressure exchanger, and wherein the rotor replacement piece is configured to rotate relative to the end plate replacement piece.

12. The method of claim 10, wherein the end plate replacement piece comprises a material that has a first wear resistance that is different than a second wear resistance of the end plate.

13. The method of claim 10, wherein the first plurality of apertures comprises a first inlet aperture and a first outlet aperture, wherein the second plurality of apertures comprises a second inlet aperture and a second outlet aperture, and wherein one or more of:
the end plate replacement piece comprises one or more connection elements configured to respectively mate with one or more complementary connection elements on the end plate;
the end plate replacement piece comprises a fastener configured to couple the end plate replacement piece to the end plate; or
the end plate replacement piece is configured to couple to the end plate via a friction fit.

14. The method of claim 10, wherein the second end face of the end plate replacement piece defines a contact face configured to contact the first end face of the end plate, wherein the contact face defines a first perimeter that matches a second perimeter of the first end face of the end plate.

15. The method of claim 1, wherein the distal end surface of the substantially cylindrical shape spans a full distal end of the component.

16. The method of claim 1, wherein the distal end surface of the substantially cylindrical shape spans a distal end of the component in two orthogonal dimensions.

17. The method of claim 1, wherein the removing of the worn portion reduces a maximum longitudinal length of the component.

* * * * *